United States Patent Office 3,449,385
Patented June 10, 1969

3,449,385
PROCESS FOR THE MANUFACTURE OF ALIPHATIC α-HYDROXYCARBOXYLIC ACIDS
Walter Müller, Leonding, near Linz (Danube), and Johann Schweighofer and Ferdinand Weinrotter, Linz (Danube), Austria, assignors to Osterreichische Stickstoffwerke Aktiengesellschaft, Linz (Danube), Austria
No Drawing. Filed Oct. 3, 1966, Ser. No. 583,933
Claims priority, application Austria, Oct. 12, 1965, A 9,192/65
Int. Cl. C07c *51/00*
U.S. Cl. 260—413      4 Claims

ABSTRACT OF THE DISCLOSURE

Saturated aliphatic α-hydroxycarboxylic acids with up to 18 carbon atoms which are unbranched in α-position are produced by reacting the corresponding α-nitratocarboxylic acids or their water soluble salts with at least one mole of a water soluble salt of sulfurous acid at a temperature between 20° C. and the boiling point of the reaction mixture.

---

The present invention relates to a process for the manufacture of aliphatic α-hydroxycarboxylic acids, which are unbranched in the α-position, by reaction of the corresponding α-nitratocarboxylic acids in an aqueous medium containing sulphites.

The α-nitratocarboxylic acids have been found to be suitable starting compounds for the manufacture of α-hydroxycarboxylic acids, with the latter being obtained in practically quantitative yield. Aliphatic α-nitratocarboxylic acids may be obtained according to the copending application Ser. No. 528,830, now Patent No. 3,324,168 in a simple and economical manner by reacting α-olefines with dinitrogen tetroxide in the presence of oxygen.

In order to convert such α-nitratocarboxylic acids into α-hydroxycarboxylic acids it has previously been proposed to carry out the saponification by treatment with dilute nitric acid or with compounds having an alkaline reaction. This however only resulted in poor yields since undesired oxidation reactions take place at the same time.

In accordance with the present invention there is provided a process for the manufacture of an aliphatic α-hydroxycarboxylic acid which is unbranched in the α-position, which comprises reacting one mole of the α-nitratocarboxylic acid which corresponds to the aliphatic α-hydroxycarboxylic acid to be manufactured and which is also unbranched in the α-position, or a water-soluble salt thereof in on aqueous medium in the presence of at least one mole of a water-soluble salt of sulfurous acid at a temperature between 20° C. and the boiling point of the reaction mixture, acidifying said reaction mixture with mineral acid and separating the α-hydroxycarboxylic acid from the resulting mixture.

The crude nitrate esters, as produced on reaction of α-olefines with dinitrogen tetroxide in the presence of oxygen, may be used directly for the reaction, without previous purification. The nitro-compounds which occasionally occur as impurities in the nitrate esters do not interfere with the course of the reaction, since they react with sulfites to give sulfonic acids which are soluble in water but insoluble in ether and which can easily be separated off during the further working up.

In the process of the present invention any sulfite-containing compound may be used as long as it it water soluble. Particularly suitable compounds are the ammonium, alkali metal and alkaline earth metal sulfites and bisulfites. Furthermore, technical ammonium sulfite lye, which may also contain a certain amount of sulfate, as produced on purifying the waste gases from sulfuric acid manufacture, may be used as a reagent. The addition of a sulfite-containing compound, according to the invention, produces, simultaneously with the hydrolysis of the nitratocarboxylic acid to the α-hydroxycarboxylic acid, a reduction of the nitrate nitrogen, whereby the sulfite is mainly oxidised to sulfate. As a result of the reduction of the nitrate nitrogen the previously mentioned undesired oxidation reactions are practically completely suppressed. Pure α-hydroxycarboxylic acid is obtained in practically quantitative yield.

The molar ratio of sulfite to nitratocarboxylic acid preferably should be at least 1:1. It is advantageous to use 2.5 moles or more than 2.5 moles of sulfite per mole of nitratocarboxylic acid.

In carrying out the process of the invention, it has proved advisable to introduce the α-nitratocarboxylic acid into the aqueous sulfite solution. It is however also possible to add the reagents simultaneously to an already reacted, or still reacting, aqueous solution of a salt of the α-hydroxycarboxylic acid which it is intended to manufacture. This latter procedure is advisable when carrying out the process continuously. When manufacturing lactic acid it is also possible to use as the reaction medium an aqueous solution of lactic acid, to which the reagents are simultaneously added. In all variations of the process good mixing of the reaction solution should be ensured. The amount of water present in the reaction charge need not suffice to dissolve the water-soluble sulfite, i.e. the sulfite can be used both as a solution or with part of it in the form of a slurry. Instead of the free nitratocarboxylic acid, a water-soluble salt thereof, above all the ammonium or alkali metal salt, is also suitable as a starting material.

The α-hydroxycarboxylic acid may be isolated from the reaction mixture by any method known per se. Thus a long-chain water-insoluble acid may after acidification with mineral acid e.g. sulfuric acid or hydrochloric acid be directly separated from the aqueous phase. The water-soluble acids of low C-number may be obtained from the acidified reaction mixture by extraction with an organic solvent.

The α-hydroxycarboxylic acids so obtained are practically free from impurities and may optionally be esterified with alcohols, or acylated with acids, without further purification. Depending on the manufacturing conditions, the α-hydroxycarboxylic acids may contain varying amounts of the corresponding hemilactides, which arise by intermolecular dehydration and which may be regarded as internal esters. These are also a constituent of commercially sold α-hydroxycarboxylic acids. The hemilactide can, by saponification with alkaline or acid materials, easily be converted to the monomolecular α-hydroxycarboxylic acid.

Straight-chain aliphatic α-hydroxycarboxylic acids, and the esters of such acids produced from them, are valuable industrially usable products. They may for example be used as wetting agents and in plant protection.

The following examples are intended further to illustrate the process of the invention.

EXAMPLE 1

447 g. of α-nitratobutyric acid (from butene–1 and $N_2O_4$) are introduced over the course of 30 minutes, with stirring, into an aqueous solution of 1512 g. of sodium sulfite in 3 litres of water which has been prewarmed to 50° C., with the temperature being kept at between 70° and 80° C. by cooling. Thereafter the reaction mixture is heated to 90° to 95° C. and left for 2 hours at this temperature. It is then cooled to about 20° C., the precipitated sodium sulfate is filtered off, the mother liquor is acidified to pH 3 with 50% sulfuric acid, and the product subsequently continuously extracted with diethyl ether or diisopropyl ether. Finally, the ether is distilled off the ethereal solution, with the α-hydroxybutyric acid remaining in a liquid form. (Yield 297 g.=95% of theory.)

These crude products now contain maximally up to 1% water and can be directly further processed (e.g. esterification to butyl α-hydroxybutyrate) without a purification process. B.P. 58° C./4 mm. Hg: $n_D^{20}$=1.4246.

EXAMPLE 2

135 g. of α-nitratolactic acid (from propylene and $N_2O_4$) and 1 litre of technical ammonium sulfite lye (259 g./l. $SO_2$, 98 g./l. $NH_3$, 33 g./l. $SO_3$) are simultaneously introduced, with stirring, into lactic acid which has been warmed to 50° C. The exothermic reaction which takes place during the dropwise addition is kept at 80° C. by cooling. Thereafter the reaction mixture is heated to its boiling point and kept for 2 hours at this temperature. It is then cooled to 20° C., the precipitated ammonium sulfate is filtered off, and the residual solution is acidified with dilute sulfuric acid and continuously extracted with ether. Thereafter the ether is distilled from the extract, whereupon pure lactic acid (B.P. 119° C./12 mm. Hg) remains (yield 85 g.=95% of theory). This lactic acid may be directly further used.

EXAMPLE 3

140 g. of crude α-nitratocaprylic acid (approx. 85% strength, made from octene-1 and $N_2O_4$) are introduced at 60° C. into a solution of 270 g. of sodium sulfite in 450 ml. of water over the course of 45 minutes, with stirring. The reaction is exothermic and the temperature is adjusted to 60° C. by cooling. When addition is complete the mixture is warmed to 90° C. to 95° C. and kept at this temperature for 3 hours. After cooling the reaction mixture is acidified with 40% sulfuric acid whereupon it separates into 2 phases. The organic phase is washed four times with 150 ml. of water and is subsequently dried over sodium sulfate. The mother liquor and the combined wash waters are extracted with ether in order to increase the yield, and the extract is dried and after evaporation of the ether is combined with the organic phase. The bulk of the impurities from the α-nitratocaprylic acid remain in the aqueous phase as sulfonic acids.

The crude product so obtained consists of free α-hydroxycaprylic acid with varying contents of 2-(α-hydroxycaproyloxy) caprylic acid,

and may be directly used for most purposes, e.g. for esterification.

The yield is 95% of theory.

The pure α-hydroxycaprylic acid may be obtained by recrystallisation from n-heptane, and in the course of this the mother liquors which no longer crystallise (enriched hemilactice) may, by saponification with caustic alkali or with acid, be practically quantitatively converted to the monomeric product.

EXAMPLE 4

345 g. of α-nitratostearic acid are introduced at 70° C. into a solution of 309 g. of sodium sulfite and 104 g. of sodium bisulfite in 1400 ml. water over the course of one hour, with stirring. The reaction is exothermic and the temperature is adjusted to 70° C. by cooling. When addition is complete, the mixture is warmed to 90 to 95° C. and kept at this temperature for 7 hours. After cooling the reaction mixture is acidified with 40% sulfuric acid with stirring, whereupon the solid α-hydroxystearic acid is precipitated. The acid is separated by filtering off,
washed with water and dried. The α-hydroxystearic acid is obtained in a yield of 90% of theory.

The products so obtained consist of free α-hydroxystearic acid with varying contents of 2-(α-hydroxystearoyloxy)-stearic acid. The pure α-hydroxystearic acid may be obtained by saponification of the anhydro-hydroxystearic acid with caustic alkali.

What is claimed is:
1. A process for the manufacture of a saturated unsubstituted aliphatic α-hydroxycarboxylic acid with up to 18 carbon atoms which is unbranched in the α-position, which comprises reacting one mole of a compound selected from the group consisting of the aliphatic α-nitratocarboxylic acid, which corresponds to the aliphatic α-hydroxycarboxylic acid to be manufactured and which is also unbranched in the α-position, and the water soluble salts thereof in an aqueous medium in the presence of at least one mole of a water soluble salt of sulfurous acid selected from the group consisting of ammonium, alkali metal and alkaline earth metal sulfites and bisulfites at a temperature between 20° C. and the boiling point of the reaction mixture, acidifying said reaction mixture with mineral acid and separating the α-hydroxycarboxylic acid from the resulting mixture.

2. A process for the manufacture of a saturated unsubstituted straight chain aliphatic α-hydroxycarboxylic acid with up to 18 carbon atoms, which comprises reacting one mole of a compound selected from the group consisting of the aliphatic α-nitratocarboxylic acid, which corresponds to the aliphatic α-hydroxycarboxylic acid to be manufactured and the water soluble salts thereof in an aqueous medium in the presence of at least 2.5 moles of a water soluble salt of sulfurous acid selected from the group consisting of ammonium, alkali metal and alkaline earth metal sulfites and bisulfites at a temperature between 20° C. and the boiling point of the reaction mixture, acidifying said reaction mixture with mineral acid and separating the α-hydroxycarboxylic acid from the resulting mixture.

3. A process according to claim 2, in which any content of hemilactide of the hydroxycarboxylic acid present in the product of reaction is converted into the free monomeric acid by saponification with caustic alkali.

4. A process according to claim 2, in which the α-nitratocarboxylic acid is introduced into an aqueous solution of the sulfite.

References Cited

UNITED STATES PATENTS 2,847,453 8/1958 Gardner et al. _____ 260—466
2,847,465 8/1958 Robertson et al. ____ 260—533
3,324,168 6/1967 Müller et al. _____ 260—467

FOREIGN PATENTS 1,189,972 4/1965 Germany.
855,880 12/1960 Great Britain.

OTHER REFERENCES

Jones, "Principles of Organic Chemistry," 1906 p. 231, The MacMillan Company.

Jones, "Inorganic Chemistry," 1947, p. 403, The Blakiston Company.

Morrison et al., "Organic Chemistry," 1959, p. 438, Allyn & Bacon.

ALEX MAZEL, *Primary Examiner.*

R. V. RUSH, *Assistant Examiner.*

U.S. Cl. X.R.

260—533, 535